Dec. 31, 1957 C. W. MOSSBERG 2,817,983
COOLANT TYPE DRILLING TOOL
Filed March 2, 1956

INVENTOR.
Carl W. Mossberg.
BY Wood, Herron & Evans.
ATTORNEYS.

United States Patent Office 2,817,983
Patented Dec. 31, 1957

2,817,983

COOLANT TYPE DRILLING TOOL

Carl W. Mossberg, Cincinnati, Ohio

Application March 2, 1956, Serial No. 569,093

3 Claims. (Cl. 77—68)

This invention relates to drilling or boring tools of the type having passageways for conducting liquid coolant to the cutting end as the rotating drill penetrates the work. Drills of this type, sometimes called "oil hole drills," are used in drilling holes into metal and other materials, particularly those which are difficult to drill or which cause rapid wear or deterioration of the drill.

One of the primary objects of the invention has been to provide a drill having an axial coolant bore bisected by a cutting element in such a way that the cutting element delineates a pair of coolant nozzles which direct streams of liquid coolant across the opposite sides of the cutting element for cooling and lubricating purposes.

According to the principles of this invention, the drill proper is fabricated from a length of drill rod having an axial bore, or from a drill having such a bore. The insert or cutting bit consists of a flat piece of hard material such as carbide having a thickness less than the diameter of the axial bore. A slot is machined in the end portion of the drill laterally across the bore and the insert is brazed or otherwise secured in the slot in a position extending edgewisely across the bore, thereby splitting or bisecting the bore and forming the two coolant nozzles on opposite sides of the insert. With the insert mounted in place, the end of the drill is ground to create cutting edges or lips along the outer edge of the hardened insert. The arrangement is such that the flow streams of the coolant are directed from the nozzles on opposite sides of the insert at or near the central axis of the drill so as to flow radially and outwardly across the face of the insert and its cutting edges.

Briefly therefore, the invention takes advantage of the inserted cutting bit, on one hand to provide hard, long-wearing cutting edges, and on the other hand, to delineate the coolant nozzles. Otherwise expressed, the invention creates the coolant nozzles with no structure or machining operations other than those involved in mounting the insert in the drill. Moreover, the relationship of the insert to the central coolant bore locates the two nozzles substantially at the central axis of the drill to create the most efficient cooling and lubricating action.

Drills equipped with coolant passageways have been constructed in several different ways in the past. In one general class, coolant holes are drilled axially through the drill body to form the two nozzles at the cutting end. However, because of the difficulty of drilling holes of small diameter, this construction has been restricted to relatively short drills.

On the other hand, to meet the demand for longer drills having coolant passageways, drills have been fabricated with external coolant tubes set into grooves running lengthwise of the drill body. This construction not only is complex and expensive, but is subject to failure because the external coolant tubes are likely to be damaged by chips and cuttings as the rotating drill penetrates the work.

Moreover, the external coolant tubes restrict the flow of coolant, since the tubes necessarily must be of relatively small diameter in relation to the diameter of the drill body.

According to the present invention, the drill can be fabricated to any desired length and yet has the advantage of the rugged internal coolant bore. The improved structure is therefore of particular advantage in constructing drills having a small diameter in relation to length.

The invention is particularly useful for deep boring or drilling of materials which, by their nature, cause the rotating drill to generate a great deal of heat, ordinarily leading to rapid deterioration and failure. The central coolant bore provides an adequate flow of coolant from points at or near the central axis of the drill across the working faces on opposite sides of the insert and across the critical zone at the inner end of the hole, thereby to create the most efficient cooling and lubricating action. The coolant streams also flush away the chips or cuttings, thus keeping the bore clear and improving the cutting action.

An important feature of the invention comprises an arrangement which projects the coolant as high velocity jet streams, but which eliminates small apertures and the likelihood of clogging. This is brought about by a pair of open grooves breaking into the coolant outlet nozzles and extending outwardly along the working face of the insert at opposite sides. When the drill is operating, the end surface of the hole being drilled closes off the open side of each groove and thus converts them into restricted passageways directing the jet streams outwardly from center in advance of the cutting edges. The streams have sufficient velocity to flush away the cuttings as fast the they are formed, thereby improving the cutting efficiency. On the other hand, since the surface of the hole itself delineates one side of the passageways, there is practically no possibility of clogging because of the rotary motion of the hole surface relative to the groove.

Briefly, the improved structure is exceptionally low in cost because of its simple, unique construction. On the other hand, it is superior to conventional drills of this type because it is more rugged and supplies flow streams of coolant directly to the most critical cutting zone in sufficient volume to control the temperatures and flush away the chips at a rapid rate.

The features and advantages of the invention are disclosed in greater detail in the following description with reference to the drawings.

Figure 1:
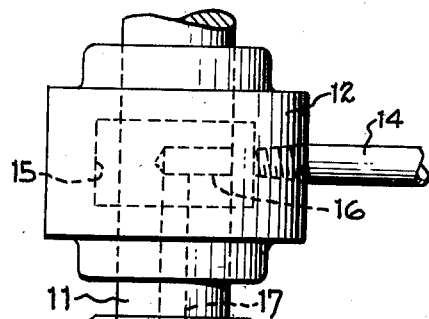
Figure 1 is a fragmentary side elevation illustrating the drill mounted in a drilling or boring machine spindle equipped with a swivel joint for supplying liquid coolant to the cutting end of the drill.

Referring to Figure 1, drill 10 embodying the principles of the invention, is shown mounted in the spindle 11 of a boring or drilling machine, the spindle having a swivel joint 12 for feeding the coolant or cutting fluid under pressure to the axial coolant bore 13 of the drill. The drill is intended for general utility either in machines which rotate and feed the drill relative to the work or in machines which mount the drill in a stationary spindle while the work is rotated and fed relative to the drill. The spindle 11 therefore represents either the rotating spindle of a drilling machine or the stationary spindle of a machine such as a turret lathe.

The swivel joint 12 represents a commercially available unit and for this reason is not shown in detail. As applied to a rotating spindle, the swivel joint establishes a rotatable but fluid-tight connection with the spindle, the coolant being supplied to the stationary swivel by way of a conduit 14. As indicated diagrammatically in Figure 1, the body of the swivel joint includes an internal annular chamber 15 surrounding the spindle. The spindle 11 includes a lateral bore 16 communicating with the chamber 15 and leading to an axial bore 17, such that the liquid coolant is conducted from conduit 14 and chamber 15 to the spindle bore 17 under pressure.

The shank 18 of the drill is secured to the end of the spindle 11 by a chuck 20 which also represents a commercially available structure. The chuck secures the drill firmly and accurately in axial alignment with the spindle and also provides a fluid-tight connection such that the coolant may flow without leakage from the lower end of the spindle bore 17 to the upper end of the drill bore 13. It will be understood that the structure shown in Figure 1 is selected to illustrate the principles of the invention and that the coolant is supplied under pressure from the spindle to the drill for discharge at its cutting end whether the drill is rotated relative to the work or vice-versa as indicated above.

Figure 6:
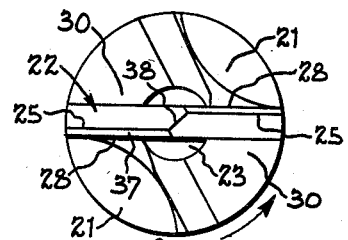
Figure 6 is an end view of the drill as projected from Figure 3.

The drill 10, which is selected to illustrate the invention, is of the type known as a "twist drill," being provided with a pair of spiral flutes 21—21 leading from the cutting end of the drill, in the cutting direction of rotation. As best shown in Figure 6, the flutes or grooves 21 preferably have a curved profile as viewed from the end and they are symmetrically located on diametrically opposite sides of the cylindrical drill body. According to the drill shown in the drawings, which is of a size selected to best illustrate the invention, the axial bore 13 is approximately one third the diameter of the drill body, leaving sufficient metal for the flutes, as viewed in Figure 6.

Figure 4:
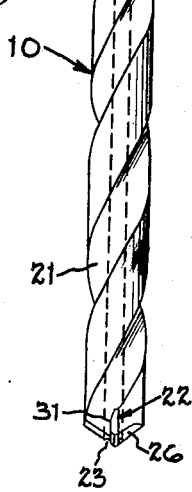
Figure 4 is a sectional view taken along line 4—4 of Figure 3, detailing the cutting bit or insert.

Referring to Figures 4 and 6, the insert or cutting bit 22 consists of a flat piece of hard material, for example, carbide, having a thickness slightly less than half the diameter of bore 13. It is mounted in the lower end portion of the drill in a position crosswise of the bore 13 so as to delineate two coolant nozzles 23—23 on opposite sides of the insert. The insert is fitted into a slot which is machined across the outer end portion of the drill and is bonded or sweated permanently in the slot by a brazing material, silver solder or other fusible metal as indicated at 24.

Figure 5:
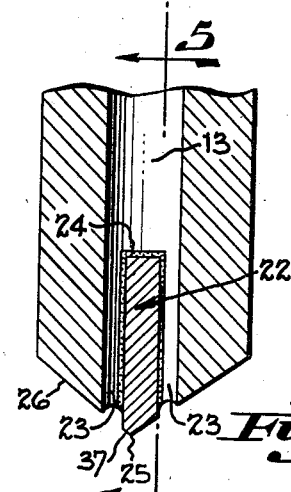
Figure 5 is a sectional view taken along line 5—5 of Figure 4, further illustrating the insert and its relationship to the bore of the drill.
Figure 5:
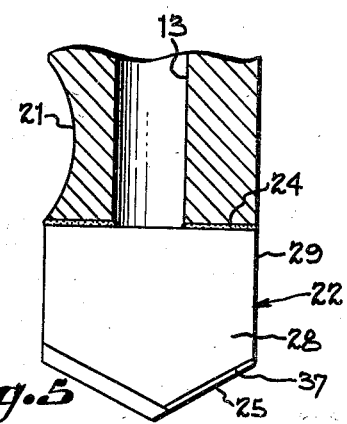

As best shown in Figures 4 and 5, the exposed end portion of the inserted cutting bit 22 is tapered upwardly in opposite directions from the axis of the drill to form the lips or cutting edges 25—25. The angle of the cutting edges follows conventional practice and varies to some extent according to the material being drilled and other variable factors. The lip angle corresponds generally to the tapered point 26 of the drill, the point and lip being ground at the same time, as explained later. Following the conventional practice, the tapered point 26, on opposite sides of the insert, curves inwardly and upwardly on the trailing side of the cutting edge 25 toward the drill axis. This provides the usual clearance angle or rake as indicated by the line 27 in Figure 3. The amount of clearance or rake also varies according to working conditions and other variables.

Figure 2:
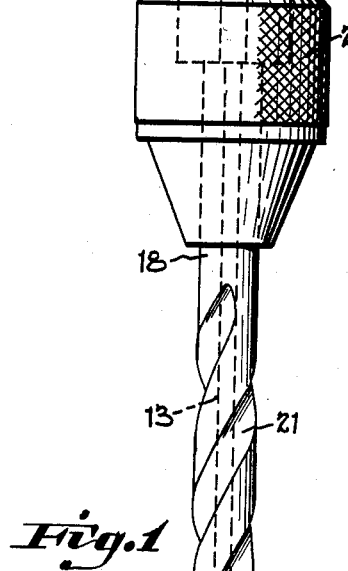
Figure 2 is an enlarged fragmentary side view detailing the cutting end of the drill.
Figure 2:
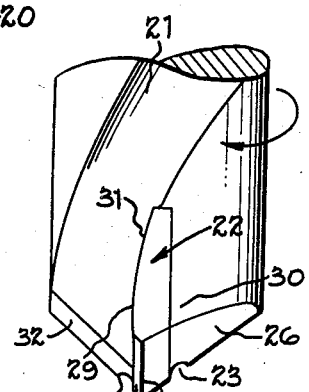

It will be observed (Figures 3 and 5) that the side edges of the insert are flush with the cylindrical body of the drill and present the side cutting edges 29—29 which act upon the periphery of the hole as the rotating drill is fed in. The insert is located in a plane relative to the flutes so that its endwise portions reside at the trailing side of each flute, in the direction of drill rotation, as indicated in Figures 2 and 6. The flutes thus expose the working faces 28—28, which are located on the leading side of the insert. These faces advance in cutting direction as the drill rotates; hence, the cutting resistance acts in a direction to force the insert against the drill body in the backing area indicated at 30 on the trailing side of the flutes. The cuttings or borings severed by the cutting edges thus follow the working faces upwardly for discharge, along with the coolant, directly into the spiral flutes as the drill penetrates. The upper portion of each working face preferably is curved inwardly as at 31 so as to blend at least partially with the surface of the flute 21 on opposite sides.

Figure 3:
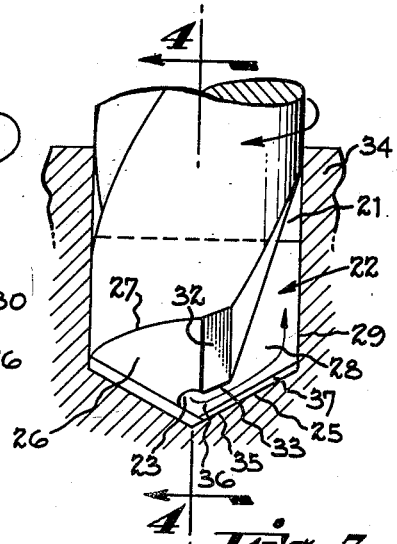
Figure 3 is a fragmentary view projected from Figure 2, further detailing the cutting end of the drill.

Referring to Figure 3, it will be noted that the trailing portion or heel of the tapered drill point 26 includes a flat relief area 32 which is inclined inwardly toward the drill axis at an angle greater than the lip clearance angle. The flat 32, as viewed in Figure 2, follows generally the inclination of the tapered point 26 and its inner end 33 breaks into the lower end of the outlet nozzle 23 adjacent the working face 28. The flat 32 thus creates a radial groove leading outwardly from each centralized outlet nozzle 23 on opposite sides of the insert.

As shown in Figure 3, when this drill is penetrating the work 34, the end surface 35 of the hole closes off the open side of the radial groove and creates a restricted passageway 36. In other words, the outlet nozzles 23 are not unduly restricted and the radial passageways 36 are created only when the drill is in operation. This arrangement avoids the use of small apertures and the likelihood of clogging.

As the rotating drill is fed in, the restricted passageways project jet streams of coolant from the center of the drill outwardly across the working faces 28 toward the periphery of the hole on opposite sides. These high velocity streams impinge against the surfaces of the hole immediately in advance of the cutting edges and against the working areas of the insert; hence, the coolant streams keep the cutting edges and adjacent portions of the insert and drill at a safe operating temperature and maintain maximum cutting efficiency. This is of special importance in drilling materials which cause rapid heating of the drill and consequent deterioration of conventional drills.

During the drilling operation, the drill is fed into the work at a rate consistent with the type of material, while the coolant is forced in under sufficient pressure to project the jet streams from the restricted radial passageway 36. As the metal or material is removed by the cutting edges, the jet streams of coolant rapidly flush away the chips or borings as fast as they are formed, thus keeping the bore as clear as possible to improve cutting efficiency. The coolant, with the cuttings entrained in it, passes across the working faces and outwardly along the flutes, the flow rate preferably being sufficient to maintain the particles in suspension in the discharging coolant until the mixture reaches the outer end of the hole. At this point, the mixture may be collected and recirculated back to the spindle for reuse, the cuttings being first strained or otherwise separated from the coolant.

In the present example, the bottom cutting edges 25 are provided with a slight chamfer or negative rake 37 leading from the working forces 28. The negative rake creates a chip breaking action which reduces the chips to a small particle size to be readily flushed away by the flow streams of coolant. This action depends a great deal upon the material being drilled, the rake being omitted completely when drilling into materials which naturally form small chips.

As indicated earlier, the drill may be fabricated from tubular drill stock by a simple slotting and brazing operation, followed by a point grinding. Preferably, the end of the stock is cut or ground square, a slot is formed in the end portion, then a cutting bit 22 in the blank form is inserted and brazed in the slot. The blank insert preferably is somewhat over-size in width and length. After being brazed in position, the tapered point 26 of the drill is ground in the usual way, thus forming the cutting edges or lips 25 on the insert. After the tapered point is ground, the relief flat 32 is ground on opposite sides by appropriately changing the angle of the drill. The negative rake 37 may also be ground at this time. After these operations, the side edges of the insert are dressed down to the diameter of the drill proper, thus forming the cutting edges 29 at opposite sides joining the tapered cutting lips 25. In some cases, the side cutting edges 29 may extend slightly beyond the periphery of the drill body to provide a slight amount of hole clearance for the drill.

Referring to Figure 6, it will be noted that the cutting edges 25 of the drill point intercept one another at the center of the drill in angularly related planes and thus form the chisel point 38 at the center of the drill, generally similar to conventional practice. The several grinding operations are performed with suitable fixtures, and in the event the insert is formed of carbide or equivalent material, a diamond grinding or dressing wheel is utilized.

The improved drill is particularly suited for materials which generate heat rapidly when drilled, by virtue of its ability to project a large volume of coolant directly across the most critical cutting areas. Experiment has indicated further that cutting efficiency is greatly improved by the rapid chip flushing action of the high velocity flow streams in the immediate cutting zone. This action clears the rotating cutting edges as fast as the drill is fed in so as to cut down friction to a minimum, thereby to preserve the life of the tool and improve the quality and accuracy of the work.

Having described my invention, I claim:

1. A rotary tool for drilling a hole in a work piece while supplying liquid coolant to the cutting zone in the hole comprising, a cylindrical drill body having a cone-shaped cutting end, said drill body having an axial coolant bore extending through said cutting end for supplying coolant liquid under pressure to the said cone-shaped cutting end, the cutting end having a slot extending transversely thereof in a plane bisecting the end portion of said axial bore, a cutting element mounted in said slot and having an intermediate portion extending across said axial bore, said intermediate portion having a thickness less than the diameter of the bore and forming a pair of coolant nozzles in said cone-shaped cutting end on opposite sides of the cutting element, said drill body having a pair of concave chip discharge flutes on opposite sides thereof extending along the drill body from said cone-shaped cutting end on opposite sides, said cutting element having working faces residing generally parallel with the trailing sides of said concave flutes in the cutting direction of tool rotation, said working faces having cutting lips at the outer edges thereof flush with the surface of said cone-shaped cutting end said concave flutes exposing said working faces and cutting lips to the hole surface during the drilling operation, the said cone-shaped cutting end including a respective open coolant groove leading from said coolant outlet nozzles across said working faces outwardly in opposite directions toward the cutting lips thereof, the said working faces of the cutting element forming one side of said open coolant grooves, the open side of said grooves facing outwardly, whereby during a drilling operation the end surface of the hole is cut to a contour corresponding generally to said cone-shaped cutting end, said open coolant grooves being presented to said end surface and converting the same into closed coolant passageways for projecting coolant streams across the working faces to the cutting lips, thereby flushing the cuttings from the hole and advancing a mixture of cuttings and coolant across the work faces and through said flutes for discharge from the outer end of the hole.

2. A rotary tool for drilling a hole while supplying liquid coolant under pressure to the cutting zone in the hole comprising, a cylindrical drill body having a forward cutting end, said drill body having a pair of chip discharge flutes on the opposite sides thereof, said flutes being concave in cross section and having forward ends opening into the cutting end of the drill body, said flutes extending from said cutting end along the length of the drill body, said cylindrical drill body having an axial coolant bore extending therethrough and opening into the cutting end, said cutting end having a cutting bit mounted therein, said cutting bit comprising a flat plate element having a thickness less than the diameter of the coolant bore and residing in a plane substantially parallel with the axis thereof and bisecting said coolant bore, said cutting bit dividing the axial coolant bore into a pair of coolant outlet nozzles open at the said cutting end on opposite sides of the cutting bit, the opposite end portions of said bit residing along said flutes on the sides thereof which trail radially in the direction of tool rotation, the said end portions of the cutting bit providing a pair of working faces exposed by the end portions of the spiral flutes, said working faces forming the leading sides of the cutting bit in the direction of tool rotation, said cutting bit having a pair of forward cutting edges which are substantially flush with the cutting end, said cutting end having a pair of radial coolant grooves formed therein adjacent the exposed working faces of the cutting bit on the leading sides thereof, the inner ends of said grooves communicating with the respective coolant nozzles, each coolant groove having an open side facing outwardly from said cutting end, the cutting edges of the bit generating an end surface in a hole during a drilling operation, the open sides of said coolant grooves being presented to the said end surface of the hole, said surface converting the open grooves into coolant conducting passageways, whereby the liquid coolant from said axial bore is reformed into streams propelled radially from said coolant outlet nozzles along the working faces and cutting edges of the bit and into the spiral flutes for discharge with the cuttings from the outer end of the hole being drilled.

3. A rotary tool for drilling a hole while supplying liquid coolant under pressure to the cutting zone in the hole comprising, a cylindrical drill body having a substantially uniform diameter for the full length thereof, the drill body having a cone-shaped forward end, said drill body having a pair of chip discharge flutes on diametrically opposite sides thereof, said flutes being concave in cross section and having forward ends opening into said cone-shaped end of the drill body, said flutes extending from said cone-shaped end along the length of the drill body, said cylindrical drill body having an axial coolant bore extending therethrough and opening into the said cone-shaped end, said cutting end having a slot extending transversely thereof in a plane parallel with the axis of the tool and bisecting the end portion of said axial coolant bore, the opposite ends of said slot opening into said spiral flutes on the sides thereof which trail radially in the direction of drill rotation, a cutting bit bonded permanently in said slot and extending across said axial bore, said cutting bit being in the form of a flat plate element having a thickness less than the diameter of the said axial bore and thereby dividing said axial bore into a pair of coolant outlet nozzles open at the said cone-shaped forward end on opposite sides of the cutting bit, the endwise portions of said cutting bit providing a pair of working faces exposed by the end portions of the said flutes, said working faces forming the leading side of the cutting bit in the direction of tool rotation, said cutting bit having a pair of forward cutting edges which are flush with the said cone-shaped end, said cone-shaped end having a pair of radial coolant grooves formed therein adjacent the exposed working faces of the cutting bit on opposite sides thereof, the inner ends of said grooves communicating with the respective coolant nozzles, each coolant groove having an open side facing outwardly from said cone-shaped end, said grooves extending substantially in parallelism with the said cutting edges of the bit, the cutting edges of the bit generating a cone-shaped end surface in a hole during a drilling operation, the open sides of said coolant grooves being presented to the said cone-shaped end surface of the hole, said surface converting the open grooves into restricted coolant passageways, said passageways having an area in cross section not greater than half the area of the axial coolant bore, whereby the liquid coolant from said axial bore is reformed into velocity streams propelled radially from said coolant outlet nozzles along the working faces and cutting edges of the bit and into the spiral flutes at sufficient velocity for discharge with the cuttings from the outer end of the hole being drilled.

References Cited in the file of this patent

UNITED STATES PATENTS 2,237,901    Chun ------------------ Apr. 8, 1941

FOREIGN PATENTS 230,307    Switzerland ------------ Mar. 16, 1944